A. B. LAMB.
METHOD AND APPARATUS FOR TREATING GASES AND GASEOUS SUBSTANCES.
APPLICATION FILED MAY 31, 1919.
1,422,211.
Patented July 11, 1922.
4 SHEETS—SHEET 1.
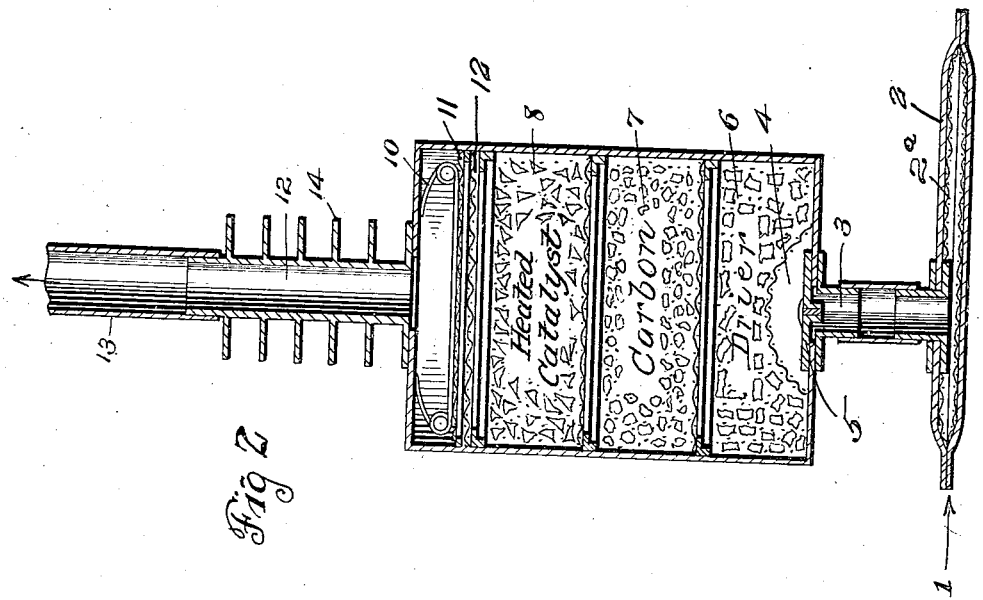
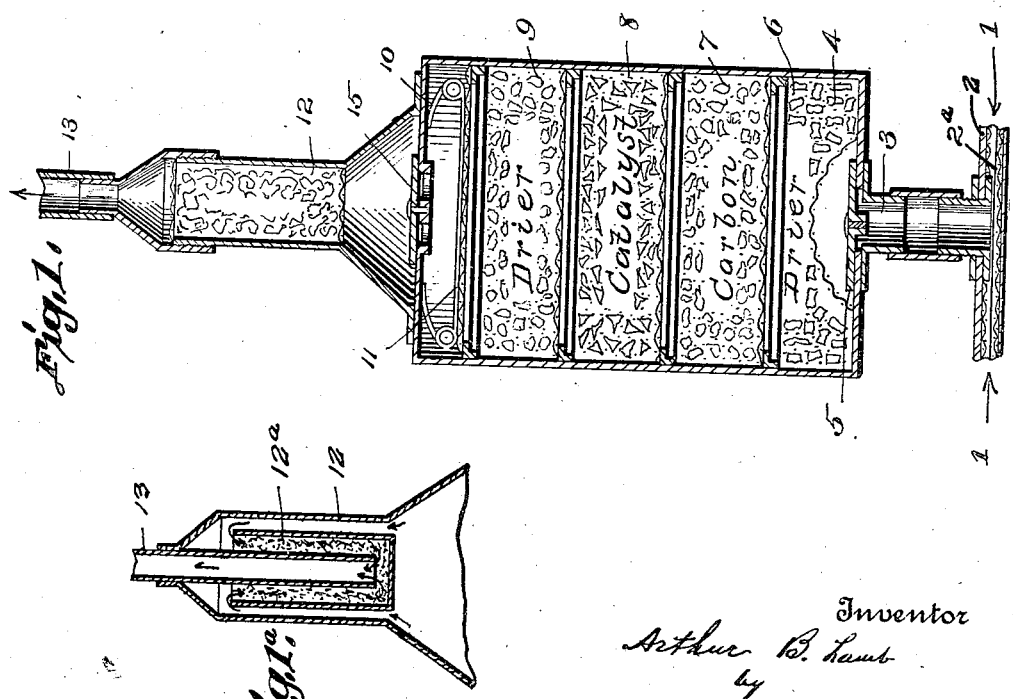
Inventor
Arthur B. Lamb
by
Francis D Hardesty
Atty.

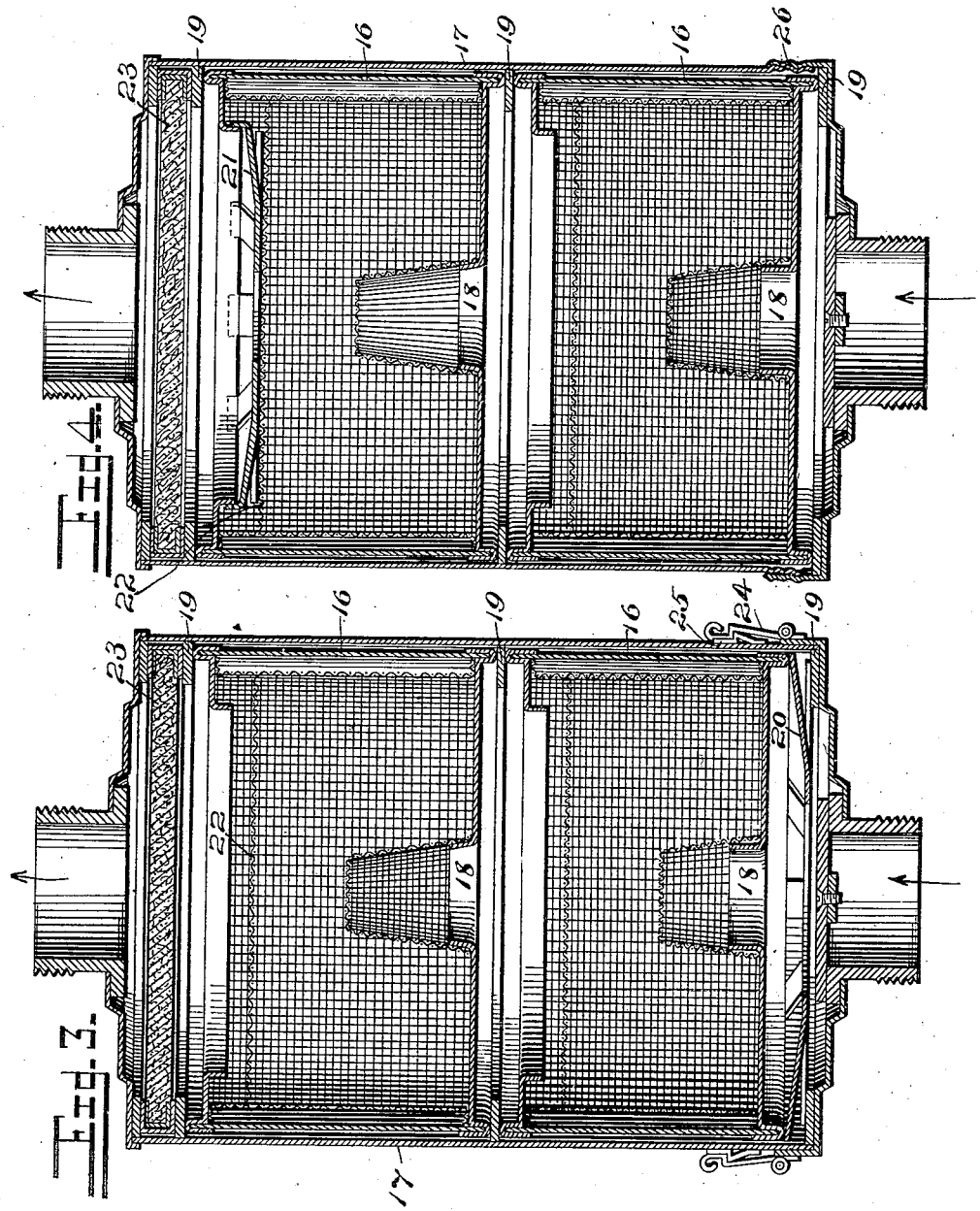

A. B. LAMB.
METHOD AND APPARATUS FOR TREATING GASES AND GASEOUS SUBSTANCES.
APPLICATION FILED MAY 31, 1919.
1,422,211.
Patented July 11, 1922.
4 SHEETS—SHEET 3.
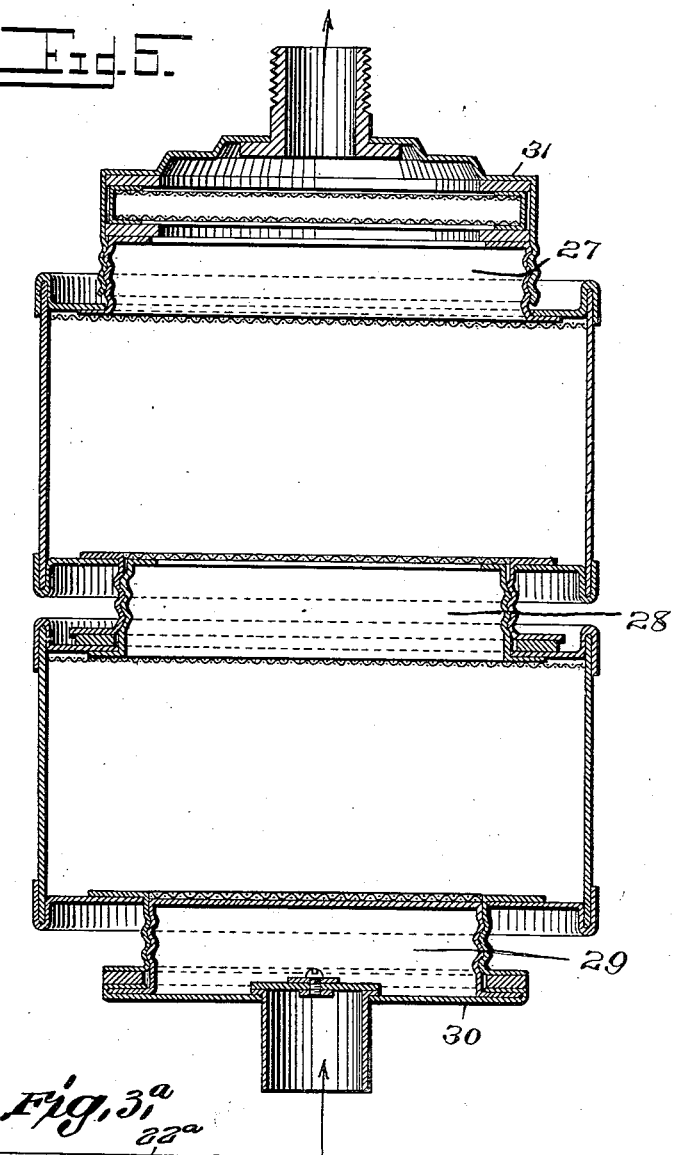
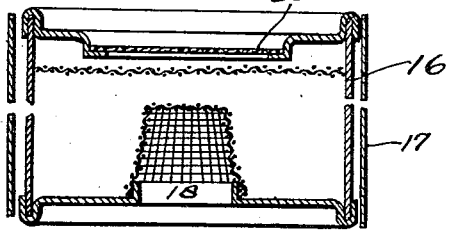
Inventor
Arthur B. Lamb.
By Francis D. Hardesty
Attorney

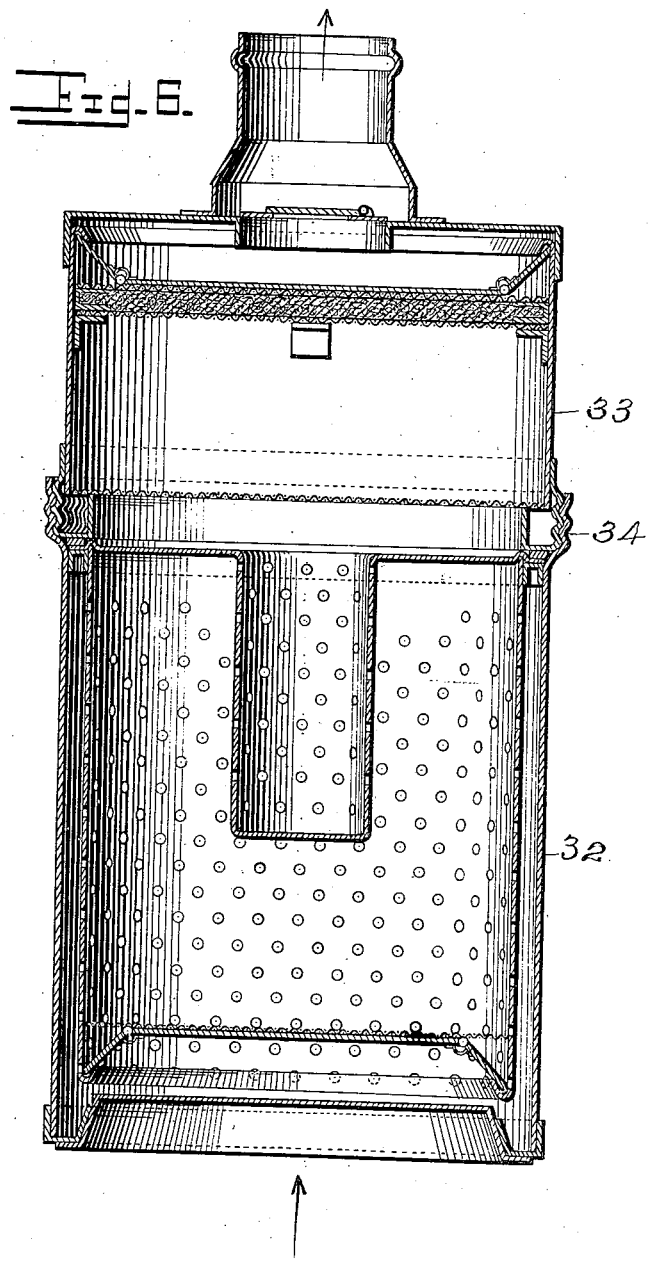

UNITED STATES PATENT OFFICE.

ARTHUR B. LAMB, OF WASHINGTON, DISTRICT OF COLUMBIA.

METHOD AND APPARATUS FOR TREATING GASES AND GASEOUS SUBSTANCES.

1,422,211.   Specification of Letters Patent.   Patented July 11, 1922.

Application filed May 31, 1919. Serial No. 301,017.

*To all whom it may concern:*

Be it known that I, ARTHUR B. LAMB, a citizen of the United States, residing at Washington, District of Columbia (whose post-office address is Cosmos Club, Washington, D. C.), have invented a new and useful Method and Apparatus for Treating Gases and Gaseous Substances, of which the following is a specification.

This invention relates to methods and apparatus for treating gases and gaseous substances.

Among the objects of this invention is to provide a method and means for eliminating toxic and harmful materials, such as poisonous gases and other gases which are injurious to animals from air and gas mixtures.

Another object of this invention is to provide a process and apparatus for purifying air before it enters the respiratory organs of animals.

A further object of this invention is to provide a canister with an efficient sorbent for gases; also, with means for delivering air which is passed through the respirator at an agreeable temperature for breathing.

A further object of this invention is to provide respirators with detachable sections containing sorbing and desiccating materials.

Reference is to be had to the accompanying drawings which show certain types of apparatus embraced in this invention and also disclose certain novel features thereof.

Fig. 1 is a vertical section through a canister provided with a cooling device for the outgoing gases.

Fig. 1ª is a vertical section of a part of the canister where the gases leave the same and illustrates a conventional method of preventing water from the cooling device for the outgoing gases dropping into the drier positioned below the cooler.

Fig. 2 is a similar view in which a modified form of cooler is used.

Figs. 3 to 6 show modified forms of canisters embodying the novel features of this invention.

Fig. 3ª is a fragmental section of a canister illustrating the use of an indicator with said canister for detecting the condition of hydration of the hydrating material.

Referring to Figs. 1 and 2, air is drawn into the canister at (1) and passes through the filter (2) into the neck (3) from where it enters the canister (4) by way of the valve (5). The filter (2) is preferably of felt or paper, although any other suitable filter may be employed, and in order to keep the filter (2) in proper shape a support of perforated or reticulated material (2ª) is provided. The valve (5) may be of the ordinary flap-valve type.

The canister (4) is provided with gas treating materials which are placed close to each other. In Fig. 1, there are shown the sections 6, 7, 8 and 9 containing drying material, charcoal, hopcalite sorbent and drying material, respectively, the drying material (9) being omitted from the canister shown in Fig. 2. It is to be understood that other sorbent materials, such as carbon or carbonaceous material, silica gel or iron oxide sorbents may be used in place of the charcoal and that the hopcalite may be used mixed with other sorbent materials. The sections of gas treating material are placed close to each other so that the gases upon leaving one of the gas treating materials soon come in contact with the next treater, and these sections of gas treating material are held close together by means of the spring (10), which rests upon a pad of cotton wool or similar material (11) placed on top of the section containing the drying material in Fig. 1, or, when this drying material is omitted, on top of the section containing the hopcalite sorbent, the other end of the spring (10) bearing against the top of the canister (4). The pad (11) serves to keep the material in the top section of the canister from falling into the neck (12).

The gases upon entering the canister pass through the treating materials contained therein and may be then filtered through a filter (11ª), shown in Fig. 2, which filter may be similar to the filter (2), and then pass out by way of the neck (12) to the pipe or tube (13) leading to the respirator. The gases on passing through the neck (12) are cooled by some suitable means. In Fig. 1 there is shown a sponge which contains a cooling liquid, and when this type of cooler is used provision should be made to keep the liquid from dropping into the drying material within the canister. A convenient means for accomplishing this is shown in Fig. 1a. Here the outlet tube (13) extends into a special compartment (12a) within the neck portion (12) which holds the sponge carrying the cooling liquid. In Fig. 2 the cooling means consists of plates (14) of large area and of good heat conducting material, upon the neck (12).

This invention contemplates the use of any cooling means in which a "change of state" is involved. By "change of state" is meant from liquid to gas, or vice versa, from solid to liquid or vice versa, from a solid to another solid where there is a change in crystal form, or from a solid to another solid where the water of crystallization undergoes a change.

The canister may be provided with a valve (15) for the outgoing gases, as shown in Fig. 1.

The gases or air which are treated by passing first through a filter, are relieved of suspended material contained therein. Whether or not this suspended matter would otherwise be removed from the gases in passing through the canister, the preliminary filtering action is desirable. This filter has been found to remove dust and smoke particles which would not be removed by the gas treating materials; also, by keeping these objectionable materials away from the gas treating materials the life of the latter is extended.

After filtration the gases are dried by means of the drying material (6) which may be calcium chloride or any other suitable dehydrating material. The gases then pass on to the protective sorbent (7) which may consist of dry charcoal, other suitable carbonaceous material or sorbent material and which serves as a protection against toxic gases and other substances which might tend to "poison" the hopcalite sorbent, to the action of which the gases are next subjected. The hopcalite, which is described in Patent No. 1,345,323 to J. C. W. Frazer and C. C. Scalione, consists of a mixture of oxides and has the power of selectively sorbing certain constituents of gas mixtures.

Briefly, the hopcalite is composed of metal oxides or basic sulphates, acetates or carbonates of the more common metals singly or in admixture, which compounds have been prepared in an extremely fine state of subdivision, collected and dried at a low temperature.

Among the metals whose oxides, basic carbonates, basic acetates and basic sulphates that have been found useful for the present purposes when properly prepared, are manganese, cobalt, copper, iron, nickel, bismuth, lead and silver and it may be stated as a general rule that mixtures of two or more of the above mentioned compounds are more active than single compounds. Further, these single compounds or mixtures may be made somewhat more active by the addition of a small percentage of certain finely divided metals, particularly metals of the platinum group.

In preparing the catalyst, it is essential first that the compounds be prepared in an extremely finely divided or semi-colloidal condition, i. e., the particles approaching the colloidal, if they are not actually so, in size and second when the product is composed of mixtures, the constituents must be intimately mixed, and third that the compounds be carefully dried at low temperature. If the drying is carried out at high temperature, the structure of the product is so modified that the activity is greatly decreased, and in many instances are entirely destroyed.

An example of preparing a single oxide is to gradually add a solution of oxalic acid to a 3 or 4% solution of permanganic acid, the quantity of oxalic acid being just sufficient to reduce the permanganic acid to manganese dioxide. The whole is kept cool, below 250° C. After standing, the manganese dioxide is filtered by suction. If there is found in the filtrate an excess of either reagent, the manganese dioxide is washed free of this, finely filtered and left as a paste. This paste may then be dried at or below 200° C.

Another method of preparing manganese dioxide is to add powdered anhydrous manganese sulphate with constant stirring to moderately strong sulphuric acid, (60–80% $H_2SO_4$). To the mixture add powdered potassium permanganate in small excess over the theoretical ratio—2 mols. $KMnO_4$ to 3 mols. $MnSO_4$. After a few minutes, pour the mixture into a large volume of cold water. Hydrated manganese dioxide is rapidly precipitated. The hydrated oxide is then washed free of sulphate and acid, collected in a filter press and dried at about 200° C. The dried cake is then crushed and screened to size producing a hard, very porous material.

Copper oxide may be prepared by precipitating directly a concentrated copper salt solution with a slight excess of a concentrated solution of sodium hydroxide or carbonate. The precipitate is washed until free of sulphate (if copper sulphate is used as a starting material) and alkali, collected in a filter press and dried at 120° C.

Cobaltic oxide is prepared by adding to a concentrated solution of a cobaltous salt at room temperature a solution containing sodium hydroxide and hypochlorite until an excess of both are present. The mixture is then allowed to stand for about one-half hour, during which time much of the excess of hypochlorite is decomposed with evolution of oxygen. The precipitate is then washed until the wash water is free from chloride and alkali, collected in a filter press and dried at about 200° C.

A product consisting of the mixed oxides of manganese and silver may be made by taking an amount of the manganese dioxide paste, above described, equivalent to 10 grams of dry manganese dioxide and suspending same in 600 cc. of distilled water. Sufficient silver nitrate is added to give 6 grams of silver oxide. Then sodium hydroxide is added to slight excess with vigorous stirring, thereby precipitating silver oxide. After settling, the material is washed three times by decantation and filtered by suction. The paste is dried, first on a water bath and then on an oil bath of 130° C. in a current of dry air or oxygen. The drying is continued until no moisture appears on a cold mirror held in the effluent gas.

A composition composed of a mixture of compounds above mentioned may also be obtained by precipitating simultaneously the several compounds from mixtures of the soluble salts in solution, for instance, the oxides of silver, copper, iron, nickel, cobalt, manganese and others, or any two or more of them may be precipitated by adding the caustic alkali to a mixture of their soluble salts in solution and after washing the precipitate, filtering and drying, as above indicated.

Further, suitable mixtures may be made by preparing separately the several constituents in extremely finely divided conditions and after intimately mixing, drying at low temperatures, as indicated.

It should be noted that the drying of the paste should be carried out at such temperatures as will not change materially the physical structure of the particles and should also be continued until all of the occluded moisture and a part of the water of hydration is removed. Suitable temperatures for this drying step have already been indicated in the specific example but, of course, will vary with the composition of the material. These temperatures should in all cases not exceed about 225–250° C. at atmospheric pressure. This drying step is essential to the activity of the material at very low temperatures.

The gases upon leaving the hopcalite sorbent may be first dried, as shown in Fig. 1, or else directly passed on to the filter (11) which serves to remove any dust which the gases may have taken up from the sorbents, and after filtration pass on through the cooling chamber (12).

In the modified forms of canisters shown in Figs. 3 and 4, the gas treating materials are placed within removable cartridges (16), which are inserted within the casing (17) of the canisters. Any suitable number of these cartridges may be used in a single canister, depending, of course, on the treatment that is desired to be given to the gases. These cartridges have central spaces (18), commonly referred to as breathing tubes, through which the gases pass before coming in contact with the treating materials, which are kept within reticulated or perforated casings. The gases pass from the central spaces through the central open work casing and then come in contact with the gas treating material and then through the outer perforated or reticulated casing.

The central spaces or breathing tubes (18) present a greater area for entrance of the gases which are exposed to the action of the gas treating materials and have the effect of promoting the efficiency of the gas treating materials in that practically all of the gas treating material in the cartridges is brought in contact with the gases. In Figs. 3 and 4 the breathing tube is shown on the side of the cartridge where the gases enter same, but it may also advantageously be located on the outgoing side, as shown in Fig. 6.

The cartridges (16) are separated from each other and from the ends of the canister by gaskets (19), having a central opening. In Fig. 3, there is shown the spring (20) which forces the cartridges close to each other. The spring (21) shown in Fig. 4 holds the reticulated or perforated material or gauze (22) down on the gas treating material within the cartridge. Springs serving each of these purposes can be used in the same canister, if desired. A pad (23) of cotton, asbestos or other suitable material is provided at the top for filtering the outgoing gases, and if desirable a similar pad may be provided for filtering the incoming gases. The canister shown in Fig. 3 may be of any desired shape, e. g. round, oblong or rectangular, since the means for fastening the cover consisting of the spring hinge (24) and catch (25) may be adapted to any shaped canister. The form shown in Fig. 4 is adapted only to canisters which are circular because the cover is screwed on the canister as shown at (26).

In the type of canister illustrated in Fig. 5 the important feature consists in making certain parts of the individual sections of the canister of such size that a definite order must be followed in assembling the parts of the canister. This feature is often very important, especially, when the assembling is done in haste or by unskilled persons and where it is desired that a certain sequence in the treatment of the gases be followed. In this view, the canister is shown as made up of two removable sections upon which the ends of the canister are screwed on, and the individual sections are screwed on to each other. By making the openings (27), (28) and (29) of different sizes the manner in which the various sections may be assembled is restricted to a definite order. With this type of canister the individual sections containing the desired treating materials can be stored separately, and independently from the cover portions (30) and (31) and assembled whenever needed. This facilitates storage and transportation. Any desired number of sections containing treating material may be used in this type of canister and the sections may be constructed as shown in Fig. 5 or else may have the central opening and reticulated or perforated structure shown in Figs. 3 and 4. Although the type of canister shown in Fig. 5 is particularly adapted for circular canisters it is obvious that by suitable modifications, for instance, by substituting the fastening means shown in Fig. 3, other shaped canisters can be made.

It has been found that the life of the sorbent materials, especially the hopcalite, used in canisters is frequently much greater than that of the dehydrating agents, such as calcium chloride. Advantage of this fact may be taken in the construction of the canister. In the canister illustrated in Fig. 6 the section (32) containing the dehydrating material is detachable from the main portion (33) of the canister, to which it is fitted in the manner shown at (34). The portion (33) contains the sorbents. Since the sorbent material can be used for much greater length of time than the drying material, the canister may be so constructed as to have the parts containing the sorbent materials inseparable from the main portion of the canister, only the portions containing the dehydrated material being detachable.

This invention contemplates the use of sorbent, oxidizing, catalytic material, such as hopcalite with or without a drier. If the sorbent, oxidizing catalyst, such as hopcalite is maintained at temperatures of 60 to 175° C. it will oxidize certain gases, for example, CO, irrespective of the moisture content, in consequence of which the drier may be dispensed with if desired. The heating of the catalyst may be accomplished by a suitable electrical means which should preferably be provided with an arrangement whereby the heating is discontinued after the catalyst is heated up to the desired temperature. It is to be understood that with a portable type of canister the source of electricity would also be portable.

This invention contemplates the use of an indicator in connection with the dehydrating material in order to show when such dehydrating material is nearing exhaustion. This indicator may operate by change of color. A specific example of using the indicator is Fig. 3ª wherein a paper (22ª) colored with cobalt chloride is placed on top of the screen above the drier on one of the detachable sections of the canister containing the dehydrating material. I do not wish to be limited, however, to the use of this particular indicator, because it may be readily observed that other devices could be substituted without changing the spirit of the invention.

Some of the gases and vapors which may be removed from air, and other gaseous mixtures are illustrated in Patent No. 1,345,323 on hopcalite and its method of preparation and include carbon monoxide, ammonia, sulphur dioxide, aldehydes, alcohols, toluene, etc., but it is to be understood that this invention may be applied to the removal of many other gases which are objectionable, injurious or toxic, which are acted upon by the sorbent oxidizing catalyst as above described.

In the foregoing description and appended claims "sorption," "sorbent" and "sorbing" include the phenomena of "absorption," "adsorption" or both.

This invention is not limited to the specific details set forth in the foregoing examples which should be construed as illustrative and not by way of limitation, and in view of the numerous modifications which may be effected therein without departing from the spirit and scope of this invention, it is desired that only such limitations be imposed are are indicated in the appended claims.

I claim as my invention:

1. As a means for treating gases, a canister containing sorbent, oxidizing catalyst.

2. As a means for treating gases, a canister containing hopcalite.

3. Means for treating gases comprising detachable sections, some of said sections containing sorbent, oxidizing catalyst.

4. Means for treating gases comprising detachable cartridges, some of said cartridges containing hopcalite.

5. As a means for treating gases, a combination of drying material and gas sorbents comprising sorbent, oxidizing catalyst so arranged that the gases pass first through the drying material and then through the sorbents.

6. As a means for treating gases, a combination of drying material and gas sorbent material comprising hopcalite so arranged that the gases pass first through the drying material and then through the sorbent material.

7. In an apparatus for treating gases, a combination of a dehydrator and gas sorbent material comprising sorbent, oxidizing catalyst so arranged that the gases pass first through the dehydrator and then through the sorbent material and means for filtering the gases before reaching the dehydrator.

8. In an apparatus for treating gases, a combination of a dehydrator and gas sorbent material comprising hopcalite so arranged that the gases pass first through the dehydrator and then through the sorbent material and means for filtering the gases before reaching the dehydrator.

9. In an apparatus for treating gases, a combination of a dehydrator and gas sorbent material comprising hopcalite so arranged that the gases pass first through the dehydrator and then through the sorbent material, and means for filtering the dried, unsorbed gas as its issues from the sorbent material.

10. An apparatus for treating gases comprising a section containing a dehydrator, a section containing sorbent, oxidizing, catalytic material and a section containing another sorbent, the said sections being detachable, in close proximity to each other and so arranged that gases pass first through the dehydrator, then through the last-named sorbent and then through the sorbent, oxidizing, catalytic material.

11. An apparatus for treating gases comprising a section containing a dehydrator, a section containing sorbent carbon and another section containing sorbent, oxidizing, catalytic material, the said sections being detachable, in close proximity to each other and so arranged that gases pass first through the dehydrator, then through the carbon and then through the sorbent, oxidizing, catalytic material.

12. An apparatus for treating gases comprising a cartridge containing a dehydrator, a cartridge containing sorbent charcoal and a cartridge containing a sorbent, oxidizing, catalytic material, the said cartridges being in close proximity to each other and so arranged that the gases pass first through the dehydrator, then through the charcoal and then through the sorbent, oxidizing, catalytic material.

13. An apparatus for treating gases comprising a cartridge containing a dehydrator, a cartridge containing sorbent charcoal and a cartridge containing hopcalite, the said cartridges being in close proximity to each other and so arranged that the gases pass first through the dehydrator, then through the charcoal and then through the hopcalite.

14. An apparatus for treating gases comprising a filter, a section containing a dehydrator, a section containing sorbent, oxidizing, catalytic material, and a section containing another sorbent, the said sections and filter being in close proximity to each other and so arranged that gases pass first through the filter, then through the dehydrator, then through the last-named sorbent and then through the sorbent, oxidizing, catalytic material.

15. An apparatus for treating gases comprising a pair of filters, a section containing drying material, a section containing sorbent, oxidizing catalyst and a section containing another sorbent, the elements of the apparatus being so arranged that the gases pass first through one of the filters, then through the drier, then through the last-named sorbent, then through the sorbent, oxidizing, catalytic material and then through the other filter.

16. In an apparatus for treating gases, a pair of filters, a section containing drying material, a section containing sorbent carbon and a section containing hopcalite, the said sections being detachable and in close proximity to each other and the arrangement of the elements being such that the gases pass first through one of the filters, then through the drier, then through the carbon, then through the hopcalite and then through the other filter.

17. In combination a plurality of cartridges containing gas treating materials, said cartridges being fitted to and detachable from each other and provided with means whereby the fitting of the cartridges to each other is restricted to a definite manner, and a jacketed cooler for the treated gases.

18. In an apparatus for treating gases, individual holders containing drying material, sorbent, oxidizing, catalytic material and another sorbent, the said holders being detachable from each other and from the rest of the apparatus and disposed so that the last-named sorbent is placed in close proximity to the drying material and to the sorbent, oxidizing, catalytic material and means whereby the said holders may be fitted to each other in a definite manner only.

19. In an apparatus for treating gases, individual holders containing drying material, sorbent carbon and hopcalite, the said holders being detachable from each other and from the rest of the apparatus and disposed so that the carbon is placed in close proximity to the drying material and to the hopcalite and means whereby the said holders may be fitted to each other in a definite manner only.

20. An apparatus for treating gases comprising a cartridge containing drying material, a cartridge containing sorbent, oxidizing, catalytic material, a cartridge containing another sorbent, a cooling device and a pair of filters, the elements of the apparatus being so arranged that the gases pass first through one of the filters, then through the drying material, then through the last-named sorbent, then through the sorbent, oxidizing, catalytic material, then through the other filter and then through the cooler.

21. In an apparatus for treating gases, a pair of filters, a cartridge containing a drying material, another cartridge containing sorbent carbon and another cartridge containing hopcalite, the said cartridges being detachable and in close proximity to each other, and a cooler, the arrangement of the elements of the apparatus being such that the gases pass first through one filter, then through the drying material, then through the carbon, then through the hopcalite, then through the other filter and then through the cooler.

22. In combination cartridges separately holding drying material, sorbent, oxidizing, catalytic material and another sorbent, the said cartridges being detachable from each other and from the rest of the apparatus and disposed so that the last-named sorbent is in close proximity to the sorbent, oxidizing, catalytic material and the drier, means whereby the cartridges may be fitted to each other in a definite manner only and means for filtering gases passing through same.

23. In combination cartridges separately holding drying material, hopcalite and another sorbent, the said cartridges being detachable from each other and from the rest of the apparatus and disposed so that the last-named sorbent is in close proximity to the hopcalite and the drier, means whereby the cartridges may be fitted to each other in a definite manner only and means for filtering gases passing through the same.

24. An apparatus for treating gases comprising a section containing sorbent, oxidizing, catalytic material, said section having an inner breathing opening.

25. In an apparatus for treating gases, a plurality of sections containing gas treating materials, said sections having central breathing spaces and being detachable from each other.

26. In an apparatus for treating gases, a plurality of cartridges containing gas treating materials, said cartridges having central breathing spaces and being detachable from each other.

27. In an apparatus for treating gases, a canister containing sorbent, oxidizing, catalytic material and means for heating said material.

28. In an apparatus for treating gases, a holder containing hopcalite and means for heating said hopcalite.

29. In an apparatus for treating gases, a holder containing sorbent, oxidizing, catalytic material, a holder containing dry material and means for heating said sorbent material.

30. In an apparatus for treating gases, holders containing separately drying material, sorbent, oxidizing, catalytic material and another sorbent and means for heating said sorbent, oxidizing, catalytic material.

31. In an apparatus for treating gases, holders containing separately drying material, sorbent carbon and hopcalite and means for heating said hopcalite.

32. An apparatus for treating gases comprising a holder containing sorbent, oxidizing, catalytic material, and a detachable holder containing drying material.

33. In a process of treating gases, passing said gases through drying material, then through a sorbent, then through a sorbent material containing sorbent, oxidizing catalyst.

34. In a process of treating gases, passing said gases through drying material, then through sorbent carbon and then through sorbent material containing hopcalite.

35. In a process of treating gases, filtering said gases, then passing same through a drier, then through sorbent material including sorbent, oxidizing catalyst and then again filtering said gases.

36. In a process of treating gases, filtering said gases, then passing same through a drier, then through sorbent material including hopcalite and then again filtering said gases.

37. In a process of treating gases, passing same through a drier, then through a sorbent, then through a sorbent material containing sorbent, oxidizing catalyst and then through a cooler.

38. In a process of treating gases, passing same through a drier, then through sorbent carbon, then through sorbent material containing hopcalite and then through a cooler.

39. In a process of treating gases, filtering said gases, passing same through drying material, then through sorbent material, then through heated, sorbent material containing sorbent, oxidizing catalyst and finally cooling the said gases.

40. In a process of treating gases, filtering said gases, passing same through drying material, then through sorbent carbon, then through heated, sorbent material containing sorbent, oxidizing catalyst and finally cooling the said gases.

41. In a process of treating gases, filtering said gases, passing same through drying material, then through sorbent material, then through heated, sorbent material containing hopcalite and finally cooling the said gases.

42. In a process of treating gases, filtering said gases, passing same through drying material, then through sorbent carbon, then through heated, sorbent material containing hopcalite and finally cooling the said gases.

43. In a process of treating gases, filtering said gases, passing same through drying material, then through sorbent charcoal, then through heated, sorbent material containing hopcalite and finally cooling the said gases.

ARTHUR B. LAMB.